July 26, 1960 E. W. VAN WINKLE 2,946,848

FACSIMILE RECORDER SYSTEM

Filed March 8, 1954 2 Sheets-Sheet 1

INVENTOR.
EDGAR W. VAN WINKLE
BY
Max H. Farmer
ATTORNEY

July 26, 1960 E. W. VAN WINKLE 2,946,848

FACSIMILE RECORDER SYSTEM

Filed March 8, 1954 2 Sheets-Sheet 2

INVENTOR.
EDGAR W. VAN WINKLE
BY
Max D. Garner
ATTORNEY

United States Patent Office 2,946,848
Patented July 26, 1960

2,946,848

FACSIMILE RECORDER SYSTEM

Edgar W. Van Winkle, Rutherford, N.J., assignor to the United States of America as represented by the Secretary of the Navy Filed Mar. 8, 1954, Ser. No. 414,917

3 Claims. (Cl. 178—6.8)

This invention relates to an improved facsimile recording system and more particularly to a facsimile recording system which develops for visual inspection on the face of a recording cathode ray tube a substantially stationary image of information taken off sheet material and transmitted by facsimile; the stationary image is developed synchronously line-by-line with the transmission of that information by a facsimile scanning process applied to the sheet material containing the information.

U.S. Patent #2,540,922 is cited to illustrate the current state of the facsimile art. The patent shows conventional portions of facsimile systems in current use. There is shown therein a transmitter drum rotatably supported on a fixed traverse screw and having a linear phasing mark parallel to its axis. A synchronous motor is coupled to the transmitter drum to rotate the latter at a constant rate and to move the latter longitudinally along the traverse screw at a constant rate. A sheet of paper bearing the information to be transmitted is wrapped around and secured to the transmitter drum with one edge of the paper aligned with the phasing mark. The signal carrier is generated by means driven by the synchronous motor so that the frequency of the carrier is a multiple of the rate of rotation of the transmitter drum. A lamp is focused by a lens means to a fixed point in the path of the transmitter drum surface and a phototube is sighted at the same fixed point. When the transmitter drum is driven, the focused light spot describes a tight spiral path on the transmitter drum and the phototube generates a signal which is proportional to that part of the energy from the lamp that is reflected from the transmitter drum. The reflected energy varies with the tone or shade at the focal point. The signal generated by the phototube is amplitude modulated on the carrier. The modulation information contains periodic pulses corresponding to the movement of the phasing mark past the focal point of the lens.

Generally the carrier frequency of a facsimile signal is 1800 cycles per second; this frequency has been widely adopted because it is suitable for transmission over telephone audio circuits and because it is a convenient multiple of 60 cycle power supply frequency. However, insofar as facsimile system operation is concerned, the carrier frequency need not be 1800 cycles per second. The carrier frequency can be greater or smaller than 1800 cycles; however, the ratio of the carrier frequency to drum speed at any one particular transmitter is constant. Also, the amplitude modulation of the carrier may be as high as 100 percent. Also, under some circumstances there is no phasing mark on the transmitter drum. There is a need for a versatile facsimile recorder adapted for monitoring that can record facsimile signals from substantially any facsimile transmitter whose carrier frequency may not be known beforehand, and which signals may or may not include periodic phasing information, and whose carrier may be interrupted repeatedly several carrier cycles each time due to 100 percent modulation of the carrier.

This invention includes a cathode ray tube for facsimile recording. A major difficulty in utilizing a cathode ray tube for facsimile recording lies in obtaining the needed deflection frequencies. The deflection frequencies corresponding to line scanning rate and page scanning rate are so low that direct current circuits are needed. A typical example of the order of deflection frequencies is one cycle every fourteen minutes in one direction and one cycle every one and one-half seconds in the other direction. A second difficulty lies in accurately synchronizing the deflection circuits for the recording cathode ray tube with the scanning speeds at the facsimile transmitter. A third difficulty is not only to synchronize the deflection circuits but also to get the beginning of the recorded lines to correspond with the beginning of the transmitted lines in the absence of a synchronizing pulse in the facsimile signal. In other words, if A B C D, equally spaced is the information included in a series of the transmitted lines, the corresponding recorded lines should read A B C D and not C D A B. The same would apply to the entire message.

A facsimile signal generally includes, in part, a particular waveform which is encountered in every line of the message scanned by the transmitter. For example, when the sheet material is wrapped around the cylinder of the facsimile transmitter, a longitudinal securing strip, probably of metal, is used to secure to the cylinder the adjacent edges of the sheet wrapped around the cylinder. The longitudinal securing strip is scanned during each line and results in the same output waveform in each line scanned. This and other characteristics repeating in each line scanned are used by this invention for synchronizing purposes.

An object of this invention is to provide an improved versatile facsimile recording system.

A further object is to provide a facsimile recording system for developing stationary images of facsimile transmitted information as the information is recorded.

A further object is to provide a facsimile recording system that is adapted for monitoring a multiplicity of working or operating facsimile channels by virtue of the immediate and direct presentation of the facsimile information from a particular channel on a substantially motionless background or screen and to quickly erase and prepare the screen for new facsimile information from the same or another channel.

A further object is to provide a facsimile recording system adapted for use in monitoring and further to provide an enlargement of copy for minute scrutiny of facsimile message content.

Other objects and many of the attendant advantages of this invention will be readily appreciated as the same becomes better understood by reference to the following detailed description when considered in connection with the accompanying drawings wherein.

In the embodiment of the invention disclosed on the drawings, an incoming facsimile signal having the character of an amplitude modulated carrier whose frequency generally is on the order of 1800 cycles per second, is amplified by a signal amplifier 12. The output energy from the signal amplifier 12 is rectified by rectifier 14 and the positive voltage portion of the rectified energy is coupled into the intensity modulation input of a dark trace cathode ray tube 16.

Figure 1:
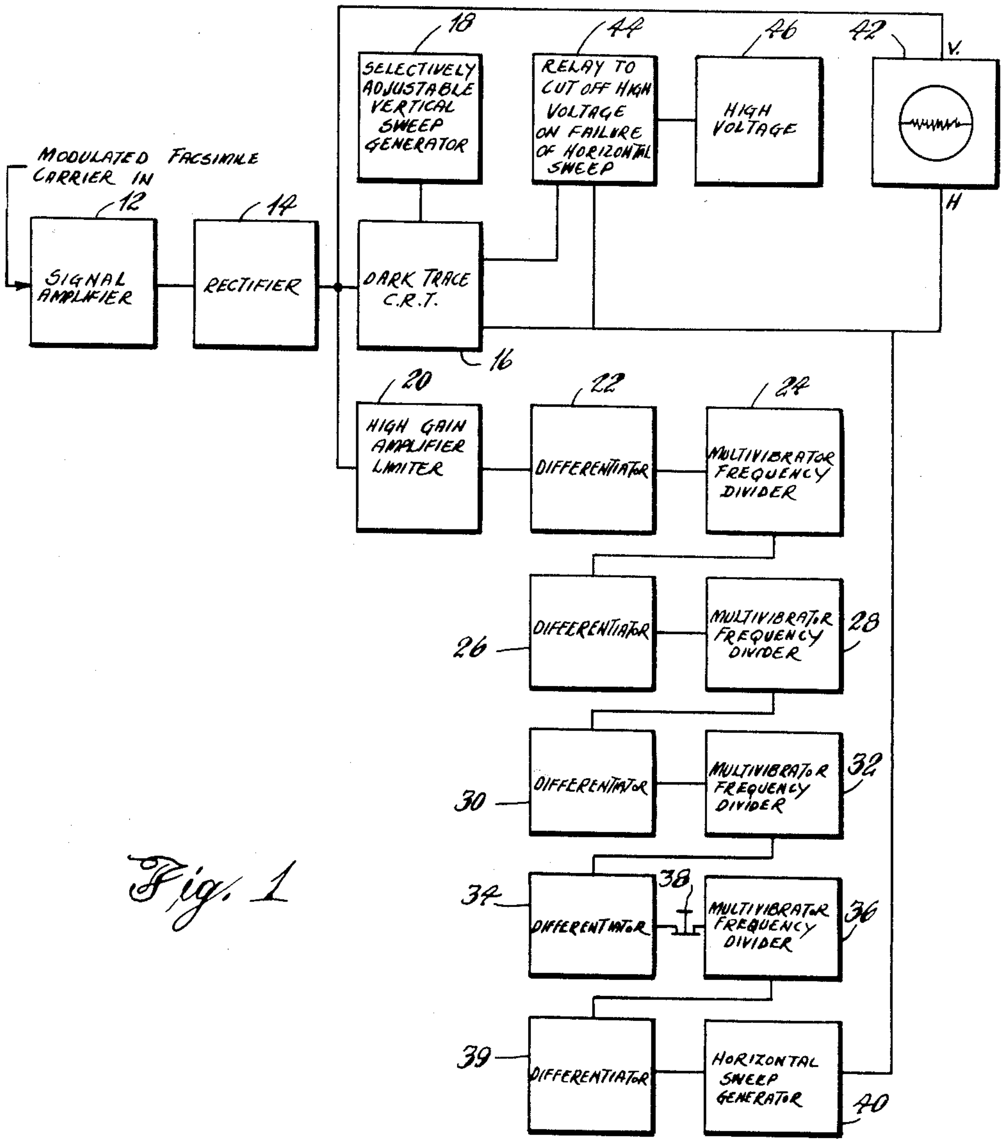
Fig. 1 is a block diagram of an embodiment of this invention.
Figure 2:
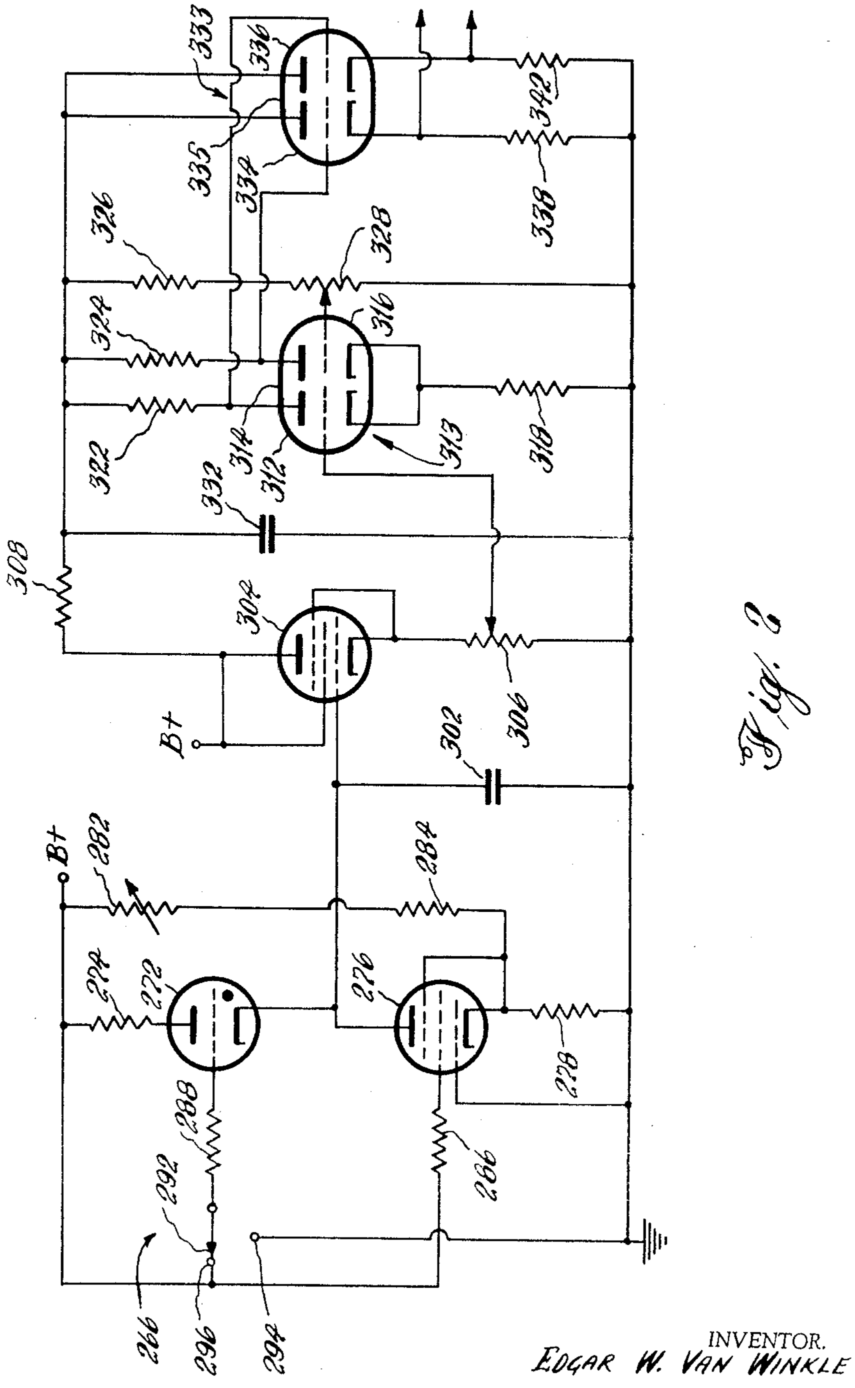
Fig. 2 illustrates a vertical sweep generator circuit for use in the embodiment shown in Fig. 1.

A selectively adjustable vertical sweep circuit 18, an example of which is shown in detail in Fig. 2, is provided for controlling the vertical deflection of the beam of the cathode ray tube 16 in accordance with page scanning rate at the facsimile transmitter whose message is received. It includes a thyratron 272 (e.g., type 884). A load resistor 274 is connected in series with the plate of the thyratron 272 and B+. Connected in series between the cathode of the thyratron 272 and ground is a sharp cut-off pentode 276 (e.g., 6AU6), and a cathode bias resistor 278 for the pentode. The cathode bias resistor 278 is part of a series resistance voltage-divider circuit connected between B+ and ground. The voltage-divider circuit includes resistor 278 the rheostat 282 and fixed resistor 284. The bias on the cathode of the pentode 276 and therefore the period of the output waveform is controlled by means of the rheostat 282, the latter having a maximum value which is more than 10 times the combined resistance of the cathode resistor 278 and the fixed resistor 284. The plate current of the pentode 276, when the latter is conducting, is substantially constant. The control grid of the pentode 276 is connected directly to ground 50. The screen grid of the pentode 276 is connected to B+ through a screen dropping resistor 286. The suppressor grid of the pentode 276 is connected to the cathode. In series with the grid of the thyratron 272 is a current limiting resistor 288. The end of the resistor 288 opposite that connected to the grid of the thyratron 272 is connected to the movable contact of a push-button switch 292. The switch 292 as shown on the drawing is in activated position. One terminal 294 of the switch 292 is connected directly to ground 50. The other terminal 296 of the push-button switch 292 is connected directly to the source of plate supply voltage for the thyratron 272. When the switch 292 is pushed so that contact 292 engages terminal 296, as shown on the drawing, the thyratron conducts immediately. The purpose of the push-button switch 292 is for positioning the spot at the top of the dark trace tube 16, the beginning of a vertical sweep. The vertical sweep voltage is developed across the condenser 302. When the thyratron 272 fires the condenser 302 charges up in negligible time to that voltage which is so related to the voltage at the plate of the thyratron 272 that the difference between them equals the extinguishing potential of the thyratron. The condenser 302 then discharges at a uniform rate through the constant current pentode 276, until the potential at the cathode of the thyratron 272 is such that the firing potential is again developed across the thyratron 272 and the latter fires again to recharge the condenser 302. The sawtooth voltage waveform thus generated is raised to a higher energy level by a cathode follower 304. The cathode follower 304 is a sharp cut-off pentode (e.g., 6AG5). The suppressor grid and cathode of the pentode 304 are directly connected to one another and the screen grid and plate are directly connected to one another. In series between cathode and ground is the resistance coil of a potentiometer 306. The output of the cathode follower 304 taken from potentiometer 306 is fed into the triode section 312 of a balanced differential amplifier 313, arranged with one moving grid and one fixed grid. The balanced differential amplifier comprises a double triode (e.g., 12AU7) one-half of which is the triode section 312 and the other half is a triode section 316. The cathodes of both triode sections 312 and 316 are mutually joined and connected to ground through a cathode resistor 318. The plates of the triode section 312 and 316 are connected in circuit with identical plate-load resistors 322 and 324. The bias on the grid of the triode section 316 is held at a substantially fixed potential by being connected to a voltage divider including a fixed resistor 326 and a potentiometer 328. Resistor 326 and the resistance coil of a potentiometer 328 are connected in series between the source of plate supply voltage for the differential amplifier 313 and ground. An RC circuit is connected across the source of the plate voltage just beyond cathode follower 304 and includes the resistor 308 and the condenser 332. The RC circuit including the resistor 308 and the condenser 332 acts to hold the plate voltage supply for the differential amplifier 313 constant. The output of the differential amplifier is very nearly push-pull. When the input signal to the grid of the triode section 312 is at its lowest value the current flow through the triode section 312 is at a minimum, the current flow through the triode section 316 is at a maximum. With increased current flow through the triode section 312 the bias on the triode section 316 increases, thereby decreasing the current flow through the latter. This is due to the fact that the change in the amount of current flow through the triode section 312 acts to vary the bias on the triode section 316. Conversely with decreased current flow through the triode section 312 the bias on the triode section 316 is reduced, permitting increased current flow through the triode section 316. The voltage at the plates of the triode sections 312 and 316 change in opposite directions in accordance with the changed current flow through each of the respective sections.

The power needed for the vertical deflection coil, not shown, of the dark trace cathode ray tube 16 is taken from the double cathode follower arrangement 333. It includes two triode sections 334 and 336 of a double triode 335 (e.g., 6AS7). The triode section 334 is connected in series with a cathode resistor 338 and the triode section 336 is connected in series with a cathode resistor 342. The grids of the sections 334 and 336, respectively, are connected directly to the plates of their respective triode sections 316 and 312 of the differential amplifier 313. No coupling condensers are needed; through proper design the bias on the cathode follower is correct for direct coupling. The vertical deflection coil, not shown, is connected to the output terminals of the cathode follower. Through this arrangement the current flow in the vertical deflection coil changes lineally flowing first as a maximum in one direction, changing lineally until it is a maximum in the other direction. The period of the vertical oscillator is very long in accordance with facsimile practice. The period of the vertical oscillator is adapted to be adjusted by means of the rheostat 282 which varies the bias on the pentode 276 and thereby the discharge rate of condenser 302.

The frequency of the sweep voltage for the horizontal deflection coil, not shown, of the dark trace tube 16 is synchronized at an exact sub-multiple of the carrier frequency of the input facsimile signal. From the output of the video amplifier 12, a portion of the amplified signal energy is fed into a high gain amplifier circuit 20. A suitable circuit for the high gain amplifier limiter 20 is disclosed in U.S. Patent #2,791,741 assigned to the assignee of this invention and filed on the same day as this application; this circuit produces a series of substantially rectangular pulses of constant amplitude repeating at the same frequency as the facsimile signal carrier frequency, there being a rectangular pulse for each carrier cycle. The portion of the amplified facsimile signal energy which is taken from the output of the signal amplifier 12 consists of the carrier frequency voltage modulated with the facsimile information. The carrier is present irregardless of what is being scanned at the transmitter end of the system. When the carrier is modulated 100 percent, groups of cycles of the carrier are eliminated at repeated intervals.

The rectangular pulse train output of the high gain amplifier limiter 20 is passed through differentiator 22 for triggering a locked mltivibrator frequency divider 24. Thence the signal passes in succession through differentiator and multivibrator frequency divider stages 26, 28, 30, 32, 34 and 36. A normally closed manual switch 38 is connected between stages 34 and 36. The multivibrators maintain their output when the driving pulses are interrupted transitorily. In this invention, if the carrier modulation is 100 percent or close to 100 percent, the series of substantially rectangular pulses from the high gain amplifier limiter 20 are interrupted repeatedly for a number of pulses at a time. However, the multivibrator frequency divider stages maintain their output at the same repetition rate when the carrier is interrupted as when the carrier is present: If an interruption is comparatively brief there is no frequency drift. A horizontal sweep generator 40 is connected to the output of differentiator 39. Since the repetition rate of the output voltage pulses of the multivibrator stage 36 is a fraction of the carrier frequency, phasing means are needed. Phasing is accomplished by means of the switch 38 between the multivibrator stage 32 and the multivibrator stage 36. The output end of the horizontal sweep generator 40 provides the horizontal deflection energy for dark trace cathode ray tube 16. The horizontal deflection means of an oscilloscope 42 is connected to the output of horizontal sweep generator 40 and its vertical deflection means is connected to the output of rectifier 14 for displaying the facsimile signal line-by-line.

Since the vertical sweep frequency is extremely slow, if the horizontal sweep generator 40 were to fail, the face of the cathode ray tube 16 would be burned. To provide a safety measure, a relay circuit 44 is provided for cutting off high voltage supply 46 for the dark trace cathode ray tube 16 in the event of failing of the horizontal sweep.

Synchronizing involves getting the beginning of each line on the recorder to correspond with the beginning of each transmitted line. If the recorded information were not properly synchronized, even though at the same horizontal sweep frequency, the recorded information would appear the same as would be achieved by longitudinally dividing the transmitted sheet in two and securing them in reverse relationship, i.e., if the transmitted sheet read ABCD, the recorded information would read CDAB, or the like. The oscilloscope 42 helps to expedite the synchronizing process. The horizontal deflection frequency of oscillosope 42 is identical with the horizontal deflection frequency of the dark trace tube 16 and the transmitted line rate, where known, and the vertical deflection is proportional to the rectified instantaneous voltage of the facsimile signal from rectifier 14. Since each line of the facsimile signal has a repeating characteristic viewing this repeating characteristic serves to guide in synchronizing. Where the transmitted line rate is not known, the oscilloscope 42 permits observation of the voltage waveform. In connection with the latter the synchronizing system for the horizontal sweep voltage would be eliminated and replaced by a free-running oscillator. By adjusting a free-running oscillator in the horizontal sweep circuit while observing the waveform pattern, it is possible to effect synchronization even where the line rate at the transmitter is unknown. Though the circuit as described does not include a free-running oscillator, it is a simple matter to generate the sweep voltage under the control of an adjustable free-running oscillator.

In operation, the amplitude modulated carrier facsimile signal energy from signal amplifier 12 is rectified by rectifier 14 eliminating the negative half cycles of the signal. The positive half cycles of the signal are fed, in part, into dark trace cathode ray tube as an intensity modulation input and in part to high gain amplifier-limiter 20. The high gain amplifier limiter 20 is operable in response to the positive half cycles of the facsimile signal to generate a train of substantially identical rectangular pulses, one pulse for each positive half cycle of the facsimile signal whose amplitude exceeds the minimum level for activating the high gain amplifier-limiter 20. The rectangular pulses from the high gain amplifier-limiter 20, whose frequency is the same as the facsimile signal carrier frequency are passed through frequency dividing stages 22, 24, 26, 28, 30, 32, 34 and 36 to the horizontal sweep generator 40, the latter providing an output having a repetition frequency which corresponds to the line-by-line scanning rate of the facsimile transmitter whose signal output is received and processed by the facsimile recording system. Proper phasing of the trigger pulses for horizontal sweep generator 40 is accomplished by actuating the switch 38 in circuit between the multivibrator stages 32 and 36. Actuation of the switch 38 temporarily interrupts the triggering of the last multivibrator 36 and when triggering is resumed the output trigger pulses of the synchronizer are at a random phase relationship with respect to the output trigger pulses therefrom preceding actuation of the switch 38. By successive actuation of the switch 38 the phase of the output trigger pulses of the synchronizer is caused to change each time until there is derived the proper phase relationship. At that time, the facsimile recording system under the control of the synchronizer is ready for operation. Oscilloscope 42 whose beam is deflected horizontally synchronously with that of dark trace tube 16 and whose beam is deflected vertically in accordance with the rectified modulated carrier permits observation of the line-by-line voltage waveform of the facsimile signal as it is received. The manually operable phasing switch 38 is operated with the guidance of the waveform display on the oscilloscope.

The facsimile recording system described may be used to monitor facsimile signals directly and it also may be used to decipher unrecognizable or strange facsimile messages picked up from the airwaves and recorded. In the disclosed system, only a single line-scanning rate is provided for. By modifying the disclosed system slightly, the horizontal deflection circuit may be made selectively adjustable. The frequency of the deflection energy supplied to the vertical deflection coil of recording tube 16 is made equal to the page scanning rate of the transmitter supplying the incoming facsimile signal. The vertical deflection circuitry includes a push-button switch 292 for initiating a vertical deflection cycle thereby positioning the beginning of a recording at the top of the face of the dark-trace cathode ray recording tube 16. Adjustment in the vertical deflection frequency may be made by means of rheostat 282 in the circuit of free-running oscillator 266.

The high voltage supply 46 for the recording tube 16 is normally operative. Safety means 44 cuts off the electron beam in the recording tube 16 when the horizontal deflection circuitry becomes inoperative. During the period that line-by-line phase adjustment is being made, it is desirable not to record on the face of the recording tube 16. This may be accomplished by a circuit connection to the bias circuit of the recording tube 16 whereby sufficient negative bias is put on the grid of the recording tube 16 to cut off the electron beam. After proper phasing is established the beginning of a vertical deflection cycle is begun starting at the top of the tube face by actuation of the switch 292 in the vertical deflection circuit. This acts to cause condenser 302 to charge thereby to start a new vertical deflection cycle at the top of the recording tube.

Erasure means for the dark trace recording tube are not discussed herein because they are well known in this art. When a particular signal that has been recorded on the tube face is no longer needed, the tube face is erased so that the tube is ready for recording a succeeding message.

The system described may be used for coarse monitoring and also for qualitative monitoring. The latter is accomplished by means of trace expansion of the cathode ray tube deflection system. For example, if the vertical deflection circuit is operating at first given frequency and the horizontal deflection circuit is operating at a second given frequency, it is possible by changing the two deflection frequencies by the same factor to magnify the information received. In other words, the system can be readily adapted to exploding any section of a received facsimile message.

Obviously many modifications and variations of the present invention are possible in the light of the above teachings. It is therefore to be understood that within the scope of the appended claims the invention may be practiced otherwise than as specifically described.

I claim:

1. A facsimile recorder for use in monitoring comprising; a cathode ray visual recording storage tube; intensity modulating means coupled to said tube and adapted for varying beam intensity in said tube in accordance with intelligence signal voltage received from a facsimile transmitter whose message is being recorded by said recorder, said intensity modulating means including an amplifier for intelligence signal modulated carrier and detector means coupled between the output end of said amplifier and said tube; first deflection means coupled to said tube and adapted for applying deflection energy to the electron beam of said tube for deflecting the beam in one direction synchronously with page scanning at the facsimile transmitter, said first deflection means including manually operable means for initiating a deflection cycle in said first deflection means; second deflection means coupled to said tube and adapted for applying deflection energy to the electron beam of said tube for deflecting the beam in a direction transverse to the aforementioned direction synchronously with the line-by-line scanning rate at the facsimile transmitter; and synchronizing means coupled between said amplifier and said second deflection means for synchronizing the frequency of the deflection energy of said second deflection means with a submultiple of the frequency of the carrier.

2. A facsimile recorder as recited in claim 1 wherein said synchronizing means includes manually operable phasing means.

3. A facsimile recorder as recited in claim 2 further including an oscilloscope coupled to said second deflection means and said detector for permitting observation of the line-by-line voltage waveform of the intelligence signal synchronously with recording thereof on said storage tube whereby said manually operable phasing means of said synchronizing means may be operated with the guidance of the waveform display on the oscilloscope.

References Cited in the file of this patent

UNITED STATES PATENTS

| | | |
|---|---|---|
| 2,141,343 | Campbell | Dec. 27, 1938 |
| 2,219,120 | Somers | Oct. 22, 1940 |
| 2,228,388 | Farnsworth | Jan. 14, 1941 |
| 2,273,172 | Beers | Feb. 17, 1942 |
| 2,284,417 | Gray | May 26, 1942 |
| 2,451,044 | Pierce | Oct. 12, 1948 |
| 2,540,922 | Wickham | Feb. 6, 1951 |
| 2,548,789 | Hergenrother | Apr. 10, 1951 |
| 2,563,472 | Leverenz | Aug. 7, 1951 |
| 2,585,846 | Rosenthal | Feb. 12, 1952 |
| 2,611,027 | Hammond | Sept. 16, 1952 |